United States Patent [19]

Curt

[11] Patent Number: 4,767,335

[45] Date of Patent: Aug. 30, 1988

[54] COMPUTERIZED ACADEMIC QUIZ CONTROLLER SYSTEM

[75] Inventor: Walter M. Curt, Harrisonburg, Va.

[73] Assignee: ComSonics, Inc., Harrisonburg, Va.

[21] Appl. No.: 77,173

[22] Filed: Jul. 24, 1987

[51] Int. Cl.[4] .............................................. G09B 5/00
[52] U.S. Cl. .................................... 434/352; 434/350
[58] Field of Search ...................... 434/336, 350, 352

[56] References Cited

U.S. PATENT DOCUMENTS

| | | | |
|---|---|---|---|
| 2,562,179 | 7/1951 | Dorf | 434/352 |
| 2,654,163 | 10/1953 | Reynolds | 434/352 |
| 3,763,577 | 10/1973 | Goodson | 434/352 |
| 4,079,365 | 3/1978 | Yamauchi | 434/350 |

Primary Examiner—Leo P. Picard
Attorney, Agent, or Firm—C. Lamont Whitham; Michael E. Whitham

[57] ABSTRACT

An academic quiz controller system includes first and second pluralities of identical and interchangeable response stations (11, 12, 13, 14 and 21, 22, 23, 24) each provided with a switch (17) and an indicator light (16) activated by the switch when pressed by a contestant. The first and second pluralities of response stations are serially connected by means of three pair telephone wire (10 and 20) and modular telephone jacks to form first and second strings of response stations. A microprocessor-controlled master console (30) has a plurality of indicators (33 and 34), one for each response station, a start switch (36) and a mode switch (37). The first and second strings of response stations are connected to the master console by means of three pair telephone wire (15 and 25) and modular telephone jacks as is a judge's switch pad (40) which is used for inputting an indication as to whether an answer is right or wrong. The master console has a plurality of modes of operation including a learn mode which recognizes the configuration of the system, a practice mode, a directed question mode and a toss-up question mode.

9 Claims, 10 Drawing Sheets

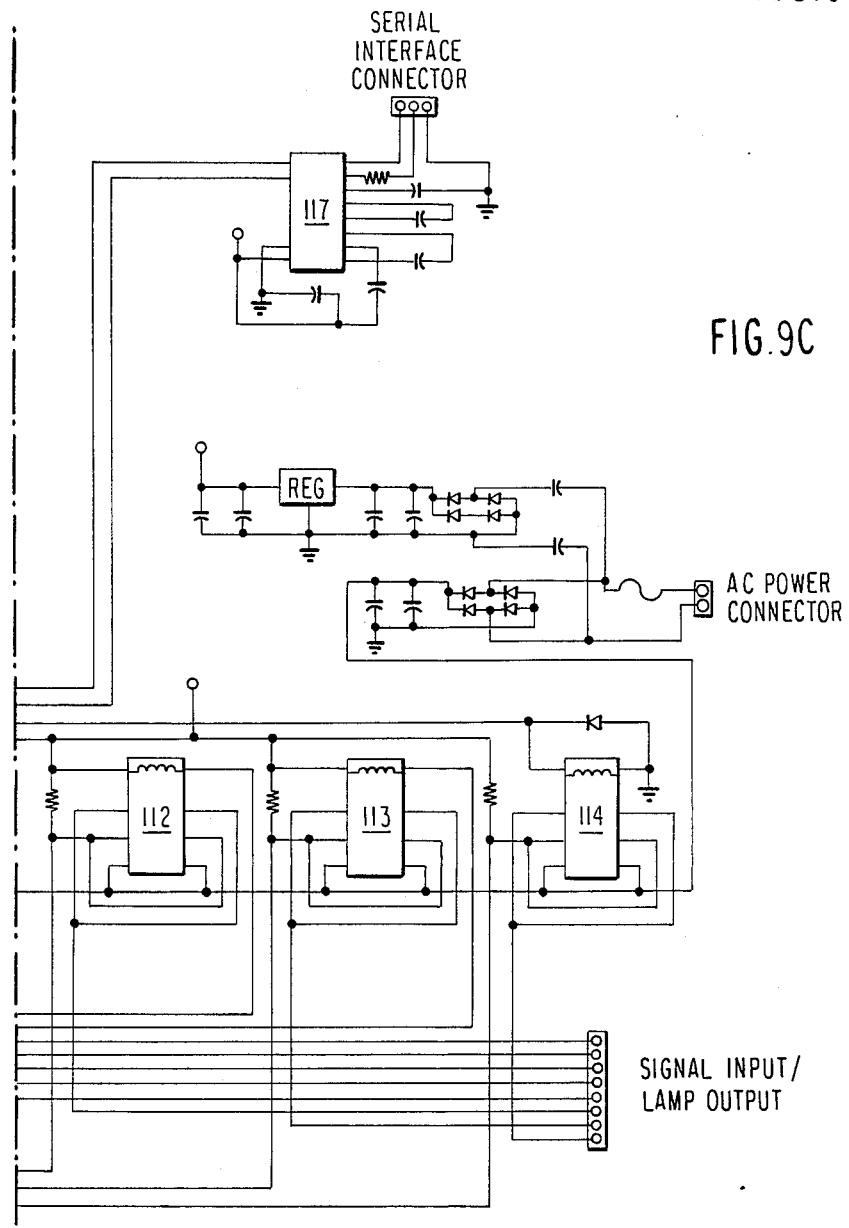

COMPUTERIZED ACADEMIC QUIZ CONTROLLER SYSTEM

DESCRIPTION

BACKGROUND OF THE INVENTION

1. Field of the Invention

The present invention is generally related to an academic quiz controller system of the type used in academic team quiz competition and, more particularly, to such a system which is microprocessor controlled to provide a highly flexible system in terms of play situations and yet is an inexpensive and easily cabled system which may be used for both practice and competition.

2. Description of the Prior Art

Academic quiz shows have been a popular feature on television for some time. Typically, three or four students from a school such as a high school or college constitute a team representing that school. One or more other teams representing another school or schools compete to answer questions posed by a moderator on different topics. Typically, there are two types of questions that are asked, a short-answer directed question and a toss-up question. The former is directed to one or the other of the competing teams with the opportunity for another team to answer the question if the first team does not respond with the right answer within in a predetermined period of time. The latter may be answered by the first team member or contestant activating a light and/or buzzer indicating that they know the answer.

The equipment for such academic team competition has evolved over the years, and has become both more sophisticated and more complex, adding greatly to the expense of such equipment. Generally, the moderator is provided with a control console which communicates in parallel with response stations provided for each member of each team. From the control console, the moderator can control a timer and observe which contestant provided a first input. The response stations usually include a light and/or a buzzer activated by a switch which is pressed by a contestant. Each of the response stations is separately cabled to the control console requiring some care and knowledge in assembling the system.

Attempts have been made in the past to provide simple and inexpensive quiz controller systems, but this has usually been at the expense of making the system less flexible in operation. One such example is shown in U.S. Pat. No. 3,763,577 to Goodson and comprises a series of contestant switch boxes physically cabled to a single cordset for each team and each cordset is plugged into a control console for the moderator. Electrically, each switch box comprises a simple push button switch which is connected in to corresponding lamp drivers in the console. Power is supplied to the switches via a wire in the cordset connected to a voltage divider in the console so that if, for example, there are four members on each team, the cordset would have five wires, one for each switch plus the power wire. The lamp drivers in the console comprise a silicon control rectifier (SCR) which is gated into conduction by a corresponding switch in a switch box being depressed. The voltage supplied to the gates of the SCRs is critical in order to provide proper lockout operation, and this voltage could be adversely affected by aging of resistors and the length of the wires in the cordsets.

Thus, while Goodson accomplishes the general objective of providing a quiz controller which is simple and inexpensive, its very simplicity limits its mode of operation to but one. In addition, the use of SCR lamp drivers and a critical value for gate voltage to accomplish the desired lockout operation suggests that apparatus may malfunction in time.

One commercial system currently being marketed includes a main console unit with eight LED indicators, one for each contestant of two teams of four members each. The contestant units comprise a light which is designed to be placed on a tabletop and a hand held push button switch of the type designed to be held in the palm of the hand and having a push button actuated by the thumb. Each of these contestant units are cabled to the main console unit by separate wires which are plugged into corresponding modular telephone jacks in the back of the main console unit. The advantage of this system are that it is relatively compact and portable and that it is relatively inexpensive. However, the separate wires for each contestant unit, each of which may be up to forty feet in length, makes the system difficult to assemble requiring care in connecting the right wire to the correspondingly right jack on the main console, a problem made more difficult by the quantity of wire that must be handled. In addition, the use of hand held switches for the contestants has proved in practice to be undesireable since in the heat of competition there is a tendency for a contestant to wave the switch around sometimes causing the light to be pulled off the tabletop and at the very least being distracting to others because of the wire attached to the hand held switch.

More sophisticated electronic systems are known for examining a plurality of students. Consider for example U.S. Pat. No. 4,079,365 to Yamauchi which discloses a system with a plurality of response units connected in parallel to a memory and indicator unit. Each response unit is provided with a plurality of switches to allow students to enter a choice of answer in a multiple choice type of question posed by the teacher. A scanning unit sequentially interrogates the response units to read out the individual students' answers to the memory and indicator unit. Provision is made to allow a student to change an answer, and non-responding response units are noted in an absentee memory.

While the Yamauchi examination system is interesting, it is not adaptable for use in an academic quiz environment since it cannot detect the first to answer and provide for lockout of other answers. Moreover, the ability to answer multiple choice questions and even to change an answer results in a highly complex system which, because of expense of manufacture, would limit the affordablity of such a system.

Also known in the prior art is a selection apparatus disclosed in U.S. Pat. No. 3,666,873 to Pincus which enables various competitors to determine between themselves and by virtue of a counting apparatus the correctness or incorrectness of the selection or the time required to make the selection of some display events. The apparatus is of general application allowing for aptitude testing, scholarship testing, response time testing and also serving as a programmable teacher for numerous purposes. In addition, U.S. Pat. No. 3,694,935 to Friedman et al. discloses a response and scoring system for use in teaching and testing apparatus which permits reducing the number of wires between a student's responder station and an instructor's console.

This, however, is accomplished by complex time sharing techniques.

SUMMARY OF THE INVENTION

It is therefore an object of the present invention to provide an improved academic quizzer control system which is easily assembled and inexpensive to purchase without sacrificing the function and flexibility of known and more expensive systems.

It is another object of the instant invention to provide an academic quizzer system which is manufactured in small and rugged components that are interconnected with modern modular telephone cabes and jacks that facilitates the easy assembly and disassembly of the system by persons having no particular technical background.

It is a further object of this invention to provide a microprocessor-based academic quizzer system which is capable of determining the configuration of the system as assembled and provides several modes of operation for different playing situations.

It is yet another object of the invention to provide an academic quizzer system which employs response stations of unique design in which the contestant switch is integrated into the station, avoiding the need for a hand held switch and its attendant disadvantages.

It is yet a further object of the invention to provide an academic quizzer system which employs a a two-way communication protocol between response stations and a master console without reqiring additional wiring between the stations and the console.

According to the invention, the heart of the system is a microprocessor-based master console which controls the system power, the operative modes of the system, the clock, and the system reset. Indicators such as light emitting diodes (LEDs) indicate the team and team member to first activate a response station. During game play, the moderator activates the system after posing the question. Thereafter, the selected mode of operation, the timer, and the station lockout feature operate in concert with the players and a judge to conduct game play.

Modes of operation allow for variations of game play. A practice mode, for game warm-up, disables the lockout functions and allows the players, judge, and the moderator to become accustomed to system operation. For normal game play, slow and fast modes change the timer setting. The slow mode allows time for team conferral, and the fast mode requires individual response. The timer counts elapsed time following completion of the statement of the question and causes a low-tone audible buzz to be sounded upon expiration of allowed time. The timer is reset by a station response, a judge response or by control of the moderator. A station lockout eliminates possible ties between players. When the master console receives a signal from a station, all other stations are ignored, or locked out. Depending on the indication from the judge's switch, lockout of just one team can also occur. The judge's switch is a remote switch that allows a separate party, other than the moderator, to indicate a right or wrong answer. A right indication clears all lockout for the next question, but a wrong indication causes the clock to be reset and the first team to respond is locked out allowing another team to respond.

The response stations, as implemented in the preferred embodiment, are constructed with rugged acrylic plastic and are designed for tabletop use. Each response station includes an indicator light activated by an optical touch switch. System hookup is by means of three pair telephone wire using modular jacks with each response station of a team connected in series to the master console eliminating multiple cables and separate wiring between individual response stations and the master console as was the case in the prior art systems. The microprocessor in the master console has built-in memory that "learns" player position. Upon system initialization, the system is in a learn mode and responds to the pressing of the switch at each response station to identify and store the location of that station.

BRIEF DESCRIPTION OF THE DRAWINGS

The foregoing and other objects, aspects and advantages of the invention will be better understood from the following detailed description of a preferred embodiment of the invention with reference to the drawings, in which:

FIGS. 5A and 5B are, respectively, a pictorial view of the single piece plastic frame and switch operator for the response station and an exploded pictorial view of the plastic cover for the circuitry of the response station;

DETAILED DESCRIPTION OF A PREFERRED EMBODIMENT OF THE INVENTION

The invention is descirbed in terms of a preferred embodiment which should be understood as being exemplary with various modifications and alterations of that embodiment being possible, as will be recognized by those skilled in the art as the description progresses. The system described is a multi-station academic question scoring system which consists of a minimum of eight contestant response stations and one main console. The contestant response stations are connected together in a unique network configuration that allows switch data and light power to exist on the same conductor. There are two groups of four contestant response stations that connect via a three pair telephone wire and modular jack to the main console, with each group of four units having a single cable attachment to the main console unit. The individual contestant response units are constructed in a unique manner that allows for a one piece actuator formed from a single piece of plastic. This actuator, when pressed, will break the path of an infrared photodiode emitter and receiver pair. The design forms a switch with only one moving part, and that part is the complete contestant response unit. In this manner the brutal wear of constant contestant input will not degrade the performance of the switch.

Figure 1:
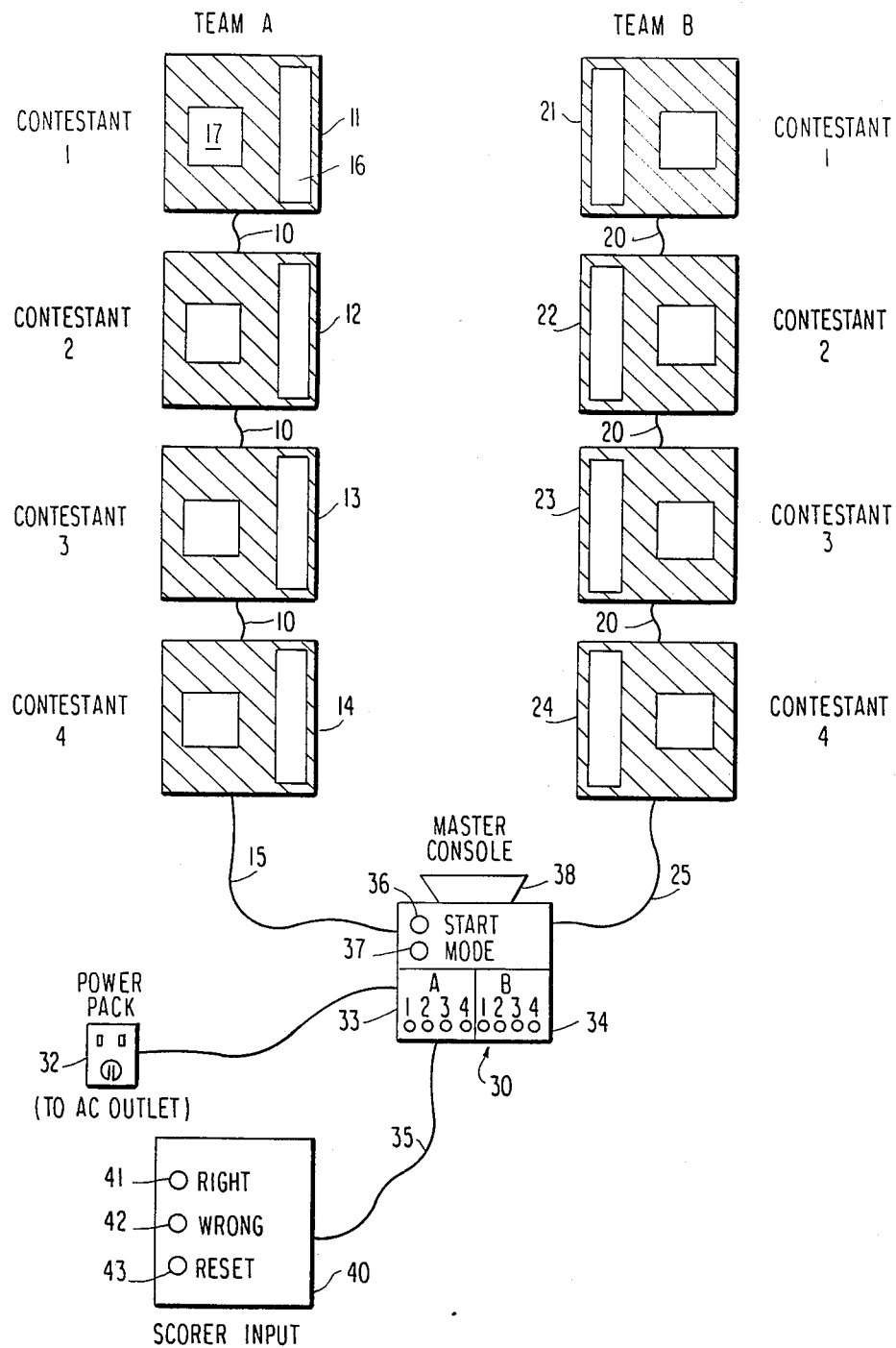
FIG. 1 is a block diagram of an exemplary system according to the invention in which two teams of four members each may participate.

Referring now to the drawings, and more particularly to FIG. 1, there is shown in block diagram form a master academic quizzer system wherein two teams of four members each can compete. This system comprises four response stations 11, 12, 13, and 14 for team A and four response stations 21, 22, 23, and 24 for team B. As will be described in more detail hereinafter, each response station is provided with a light indicator 16 activated by a manually operated photoelectric switch 17. Response stations 11, 12, 13, and 14 are serially connected by means of three pair telephone wire 10 using modular telephone jacks in each station. In like manner, response stations 21, 22, 23, and 24 are serially connected by means of three pair telephone wire 20 using modular telephone jacks in each of those stations. The two strings of response stations, 11, 12, 13, 14 and 21, 22, 23, 24, are respectively connected to a master console 30 by means of three pair telephone wire 15 and 25, again using modular telephone jacks. A judge's switch pad 40 is also connected to the master console by means of three pair telephone wire 35 using modular telephone jacks, although only three or four wires of the three pair of wires are acutally used. Finally, power is supplied to the master console 30 by a power pack 32 which is connected to an ordinary AC outlet. Power for the light indicators 16 is supplied over the same three pair telephone wire 10, 15 and 20, 25 used to interconnect the response stations to the master console.

As shown in FIG. 1, the master console 30 includes a first panel 33 of LEDs for team A and a second panel 34 of LEDs for team B. In addition, the master console has a start switch 36 for starting a timer and a mode switch 37 for changing the mode of operation. A speaker 38 is also provided in the master console 30 to produce audible ticking sounds in one mode of operation and to produce a low-tone buzz at the expiration of time or upon the indication of a wrong answer. The judge's switch pad 40 is provided with switches 41 and 42 to indicate right and wrong answers, respectively. Optionally, a reset switch 43 may also be provide on the judge's switch pad.

Figure 2:
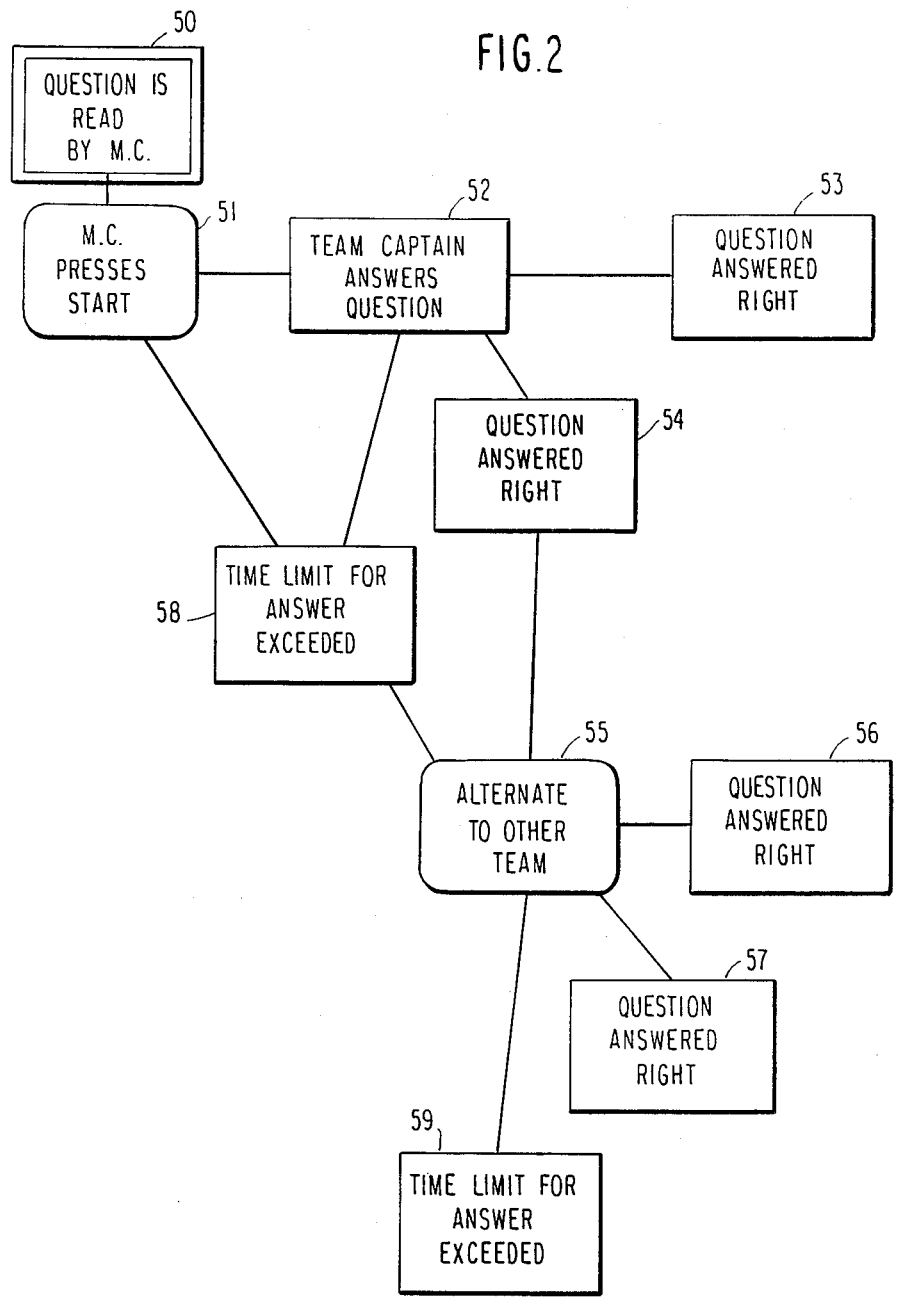
FIG. 2 is a flow chart showing the operation of the system for the case of a short answer, directed question.

For the short answer questions directed to each team, the mode or question type switch 37 on the master console 30 must be set to slow and the contestant light indicators at each response station and the corresponding LEDs on the master console are not used. When the moderator presses the start switch 36 on the master console 30, the team to which the question is directed will have a predetermined period of time, say fifteen seconds, to answer the question. The process is best illustrated by reference to FIG. 2 which shows by way of a flow chart that after the moderator reads the question in block 50, the moderator presses the start switch in block 51. The team captain may confer with team members and then, in block 52, the team captain answers the question within the time period. If the question asked is correctly answered by the team captain, the timer is reset in block 53.

Assume, however, the question asked is incorrectly answered by the team captain as indicated by the judge pressing the wrong switch 42 on the judge's switch pad 40, then a low-tone buzz will sound and the timer is restarted in block 54, giving the other team fifteen seconds to answer the question in block 55. Now, if the other team answers the question correctly, the timer is reset in block 56; but if the other team answers the question incorrectly, a low-tone buzz will sound and the timer will be reset in block 57.

Assume now that the first team to which the question was asked failed to answer the question within the fifteen second time limit as indicated by block 58. In this case, the low-tone buzz is sounded and the timer is reset giving the other team fifteen seconds to answer the question. Similarly, failure of the other team to answer the question within the fifteen second time limit results in the low-tone buzz being sounded and the timer being reset in block 59.

For toss-up questions, the mode or question type switch 37 on the master console 30 is set to fast and contestant lights on the response stations will indicate which contestant has pressed their switch first. When the moderator presses the start switch 36, the contestants will have a short period of time, say five seconds, to attempt to answer the question. The system does allow for the possiblity of a contestant pressing their switch before the moderator presses the start switch. Once a contestant's switch is pressed, however, they have five seconds to answer the question.

Figure 3:
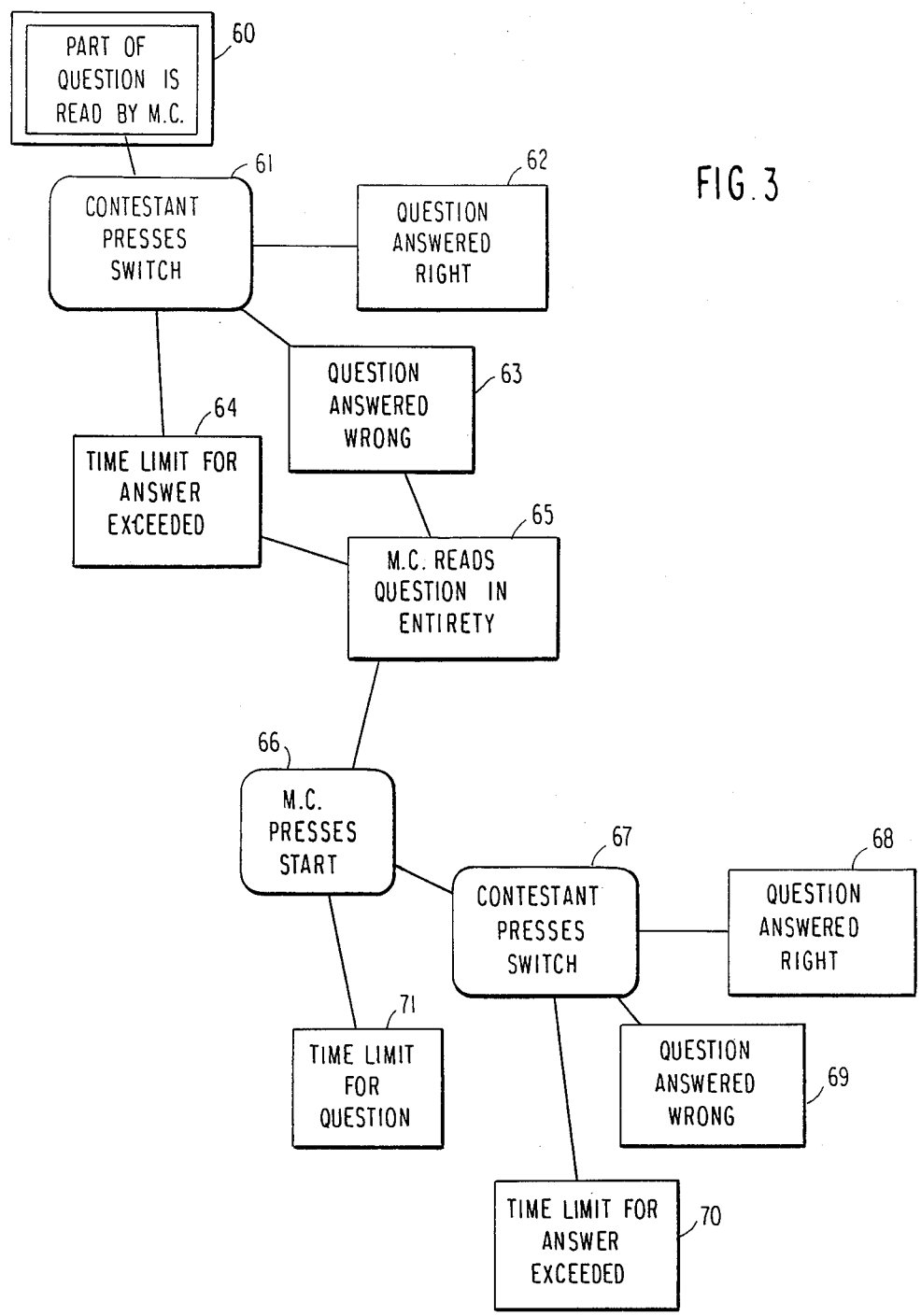
FIG. 3 is a flow chart showing the operation of the system for the case of a toss-up question in which only part of the question is read.

Reference is made to FIG. 3 which shows by way of flow chart the process wherein only part of the question is read by the moderator in block 60 before a contestant presses their switch in block 61. If the contestant answers the toss-up question correctly within five seconds of pressing their switch, the timer is reset in block 62. However, if the toss-up question is answered incorrectly or the time limit for the answer is exceeded, as indicated in blocks 63 or 64, the moderator will then read the question in its entirety in block 65 and press the start switch in block 66 to give contestants from the other team five seconds to answer the question. Assuming a constestant for the other team presses their switch in block 67 and answers the question correctly within the time limit, the timer is reset in block 68; but if after pressing the switch, the contestant answers incorrectly in block 69 or the time limit is exceeded in block 70, the low-tone buzz is sounded and the timer is reset. Alternatively, no contestant for the second team may press their switch within the time limit for the question as indicated by block 71, in which case the low-tone buzz is sounded and the timer is reset.

Figure 4:
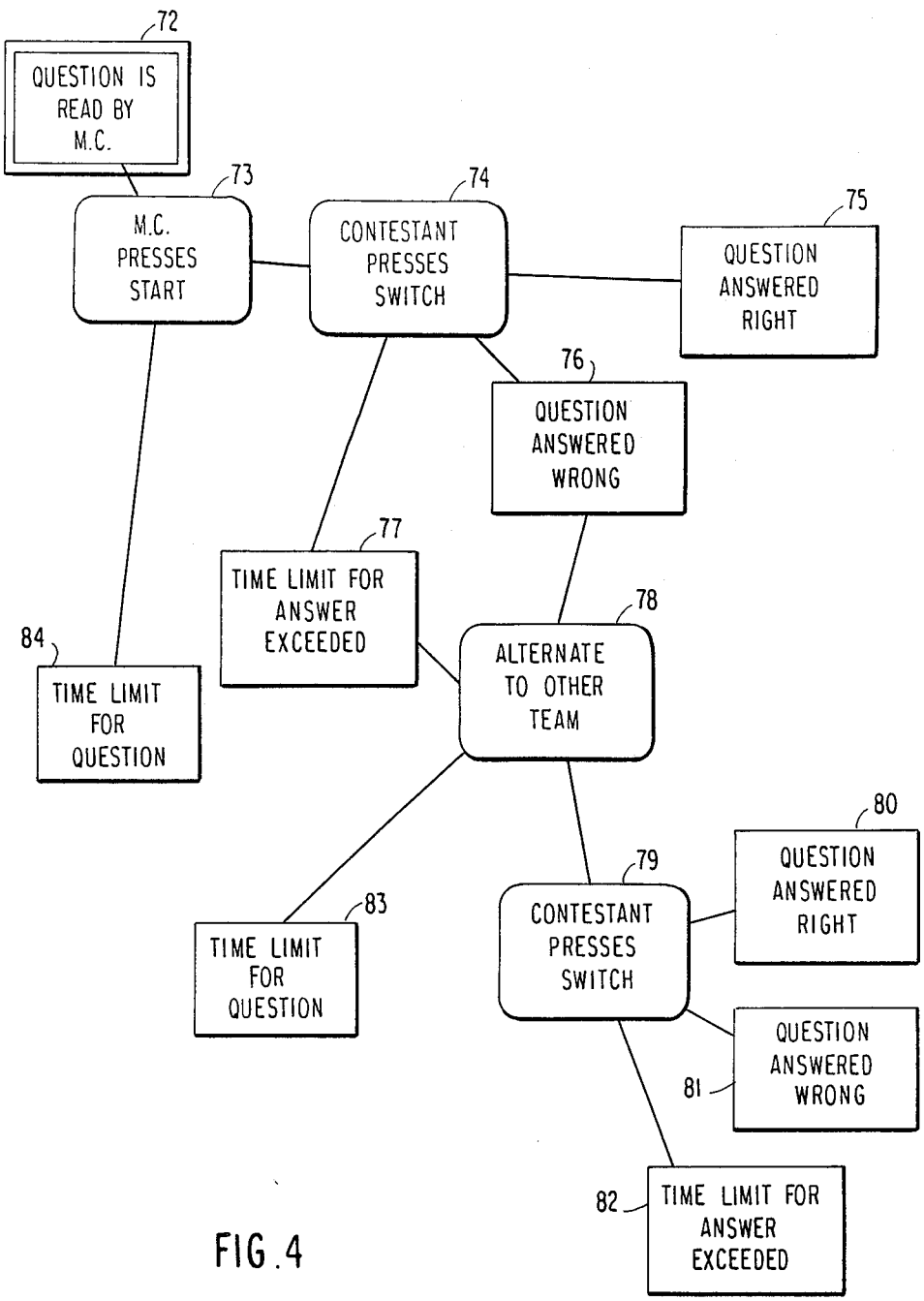
FIG. 4 is a flow chart showing the operation of the system for the case of a toss-up question in which the complete question is read.

FIG. 4 is a flow chart similar to FIG. 3 for the process followed for a toss-up question but the case illustrated assumes that the moderator completes reading the question before a contestant presses their switch as indicated by block 72. The moderator then presses the start switch 36 in block 73 to commence the five second time period. If during this time period, a contestant presses their switch in block 74 and answers the question correctly in block 75, the timer is reset. However, if the question is answered wrongly in block 76 or the time limit for answering is exceeded in block 77, the low-tone buzz is sounded, the timer is restarted, the team on which the contestant who first pressed their switch is a member is locked out, and the other team is given a chance to answer the question in block 78. If a contestant on the second team presses their switch during the time period in block 79 and answers the question correctly in block 80, the timer is reset. But if the question is answered wrongly in block 81 or the time limit for the answer is given in block 82, the low-tone buzz is sounded and the timer is reset. Similarly, if no contestant for the second team presses their switch before the time limit for the question expires in block 83, the low-tone buzz is sounded and the timer is reset. It is also possible that after the moderator presses the start switch in block 73 no contestant from either team presses their switch within the time limit for answering the question as indicated by block 84 in which case the low-tone buzz is sounded and the timer is reset.

Figure 5:
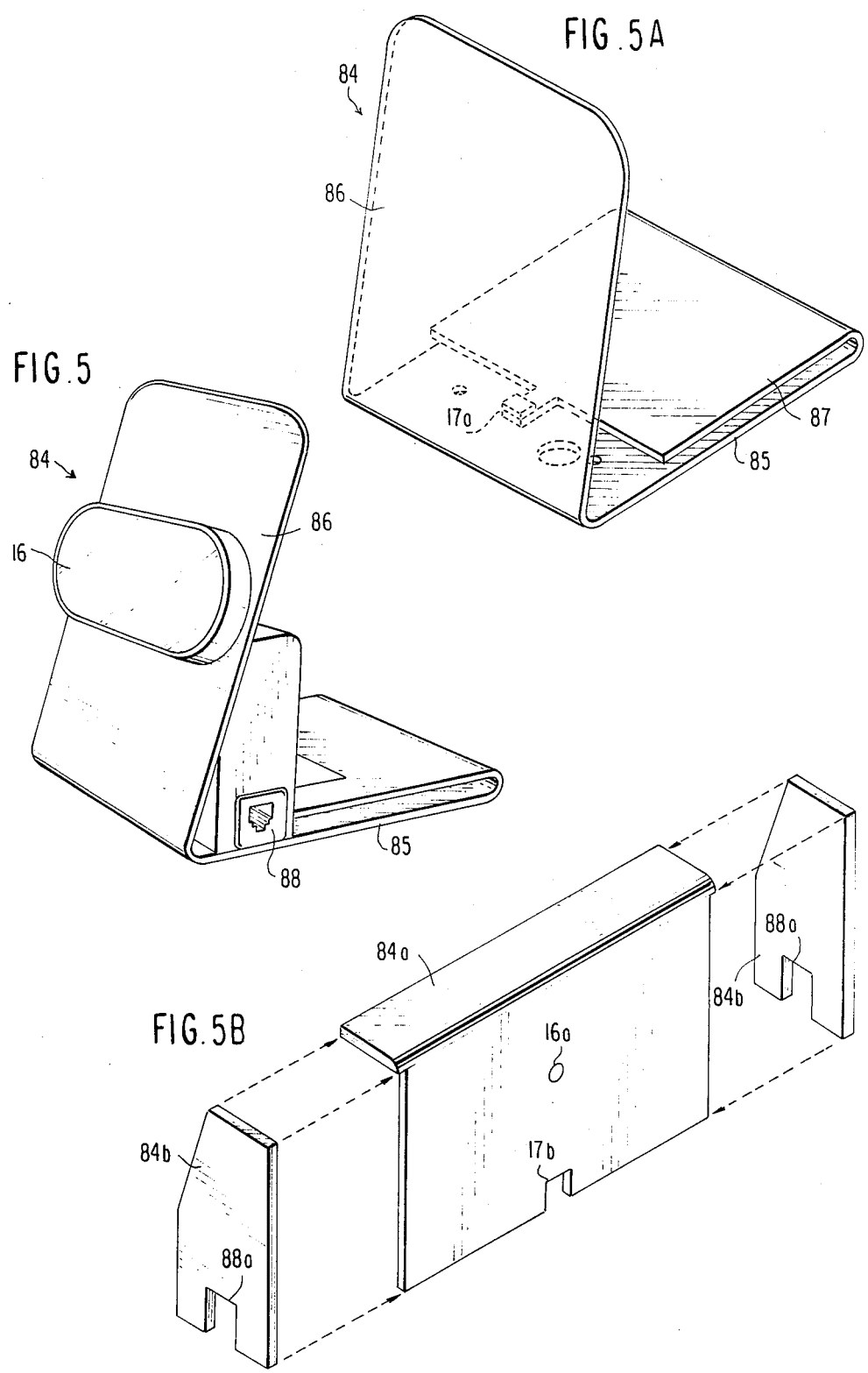
FIG. 5 is a three-fourths pictorial view showing one of the response stations.

FIG. 5 shows one of the response stations. This is a compact and rugged unit made of inexpensive acrylic plastic which is formed in the form of an L-shaped bracket 84 which conveniently sets on any tabletop. The bracket 84 has a horizontal portion 85 on which a contestant's hand may rest for easy operation of the switch which is part of the bracket. The bracket 84 also has a generally vertical portion 86 which supports a red, or other suitable color, indicator light 16 activated by the switch. The indicator light 16 faces away from the contestant and toward the viewing audience, and in this manner announces to the audience which contestant wishes to answer the question posed. As the contestant unit lamp faces away from the contestant, a separate, very small LED indicator (16b shown on FIG. 5B) is mounted on the back side of the contestant response unit to inform the contestant of a successful user interaction.

FIG. 5A illustrates the bracket 84 and clearly shows the one-piece construction. The horizontal portion 85 is folded over on itself as indicated at 87 and includes a tab 17a on the free end thereof. This tab moves in a downward arc when the top part 87 of the horizontal portion 85 is depressed. It is this tab 17a which interrupts the light of a photodiode pair for the switch actuation. FIG. 5B illustrates the housing 84a and end caps 84b which are secured to the horizontal portion 85 and abut the vertical portion 86 of the bracket 84. The housing 84a covers the circuitry of the contestant response station, but it will be observed that there is a notch 17b through which the tab 17a projects. In addition, the contestant LED indicator 16a is mounted to the vertical portion of the housing 84a at a convenient location.

On the side of the response station as shown in FIG. 5, there can be seen the female portion 88 of a modular telephone jack for making the connections described with reference to FIG. 1. There is a similar modular telephone jack on the opposite side of the response station. These modular telephone jacks are secured to the end caps 84b shown in FIG. 5B in the notches 88a provided for that purpose. All of the response stations are identical and interchangeable.

Figure 6:
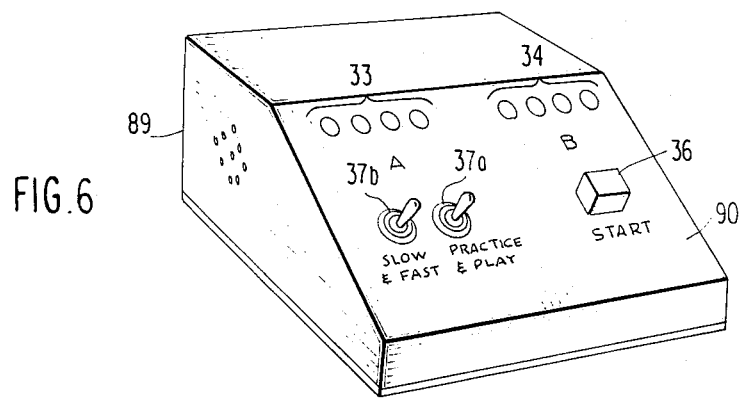
FIG. 6 is three-fourths pictorial view showing the front panel of the master controller.
Figure 7:
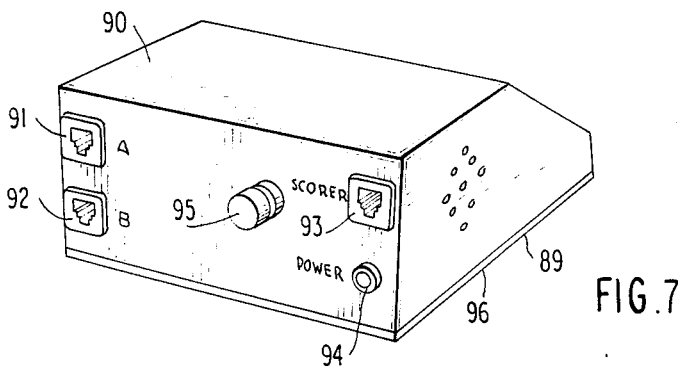
FIG. 7 is a three-fourths pictorial view showing the rear panel of the master controller.

FIGS. 6 and 7 show, respectively, front and rear three-fourths views of the master control console 30. It will be observed that this is a simple and compact unit made of a standard electrical chassis base 89 with a sloping front panel cover 90 having, as shown in FIG. 6, a first array of LEDs 33 and a second array of LEDs 34, a start switch 36 and mode or question type switches 37a and 37b. Here the mode switch 37 is implemented with two toggle switches, the first of these, 37a, for switching between the practice and play modes and the second, 37b, for switching between the slow and fast question modes. When switched into the practice mode, the lockout features of the system are disabled.

In the back portion of the cover 90, as shown in FIG. 7, there are three female portions of modular telephone jacks 91, 92 and 93 for receiving, respectively, the string of response stations for team A using wire 15, the string of response stations for team B using wire 25, and the judge's switch pad 40 using wire 35. In addition, there is a power cord input jack 94 and a fuse 95. On the side of the chassis 89, there are a series of perforations 96 behind which is a speaker.

Figure 8:
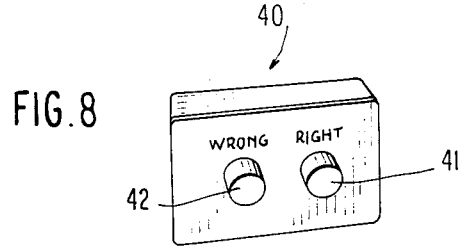
FIG. 8 is a three-fourths pictorial view showing the judge's switch.

FIG. 8 shows the judge's switch pad 40 which is a small, hand held unit having, in this embodiment, but two switches 41 and 42, one labeled right and one labeled wrong.

It will be appreciated that the components which make up the master quizzer system as shown in FIGS. 5, 6, 7, and 8 are very compact and, due to the use of three pair telephone wire and modular telephone jacks, are easily assembled. Moreover, no special furniture or other equipment is needed as both the response units and the master control console may be simply placed upon a tabletop. Because the individual contestant response units are interchangeable and serially connected in two strings with each string connectable by means of one modular jack to the control console, the person assembling the system does not need to worry about the correct connections of individual response units to the control console, not to mention the improved asthetic appearance and reduced hazard provided by eliminating multiple wires.

Figure 9A:
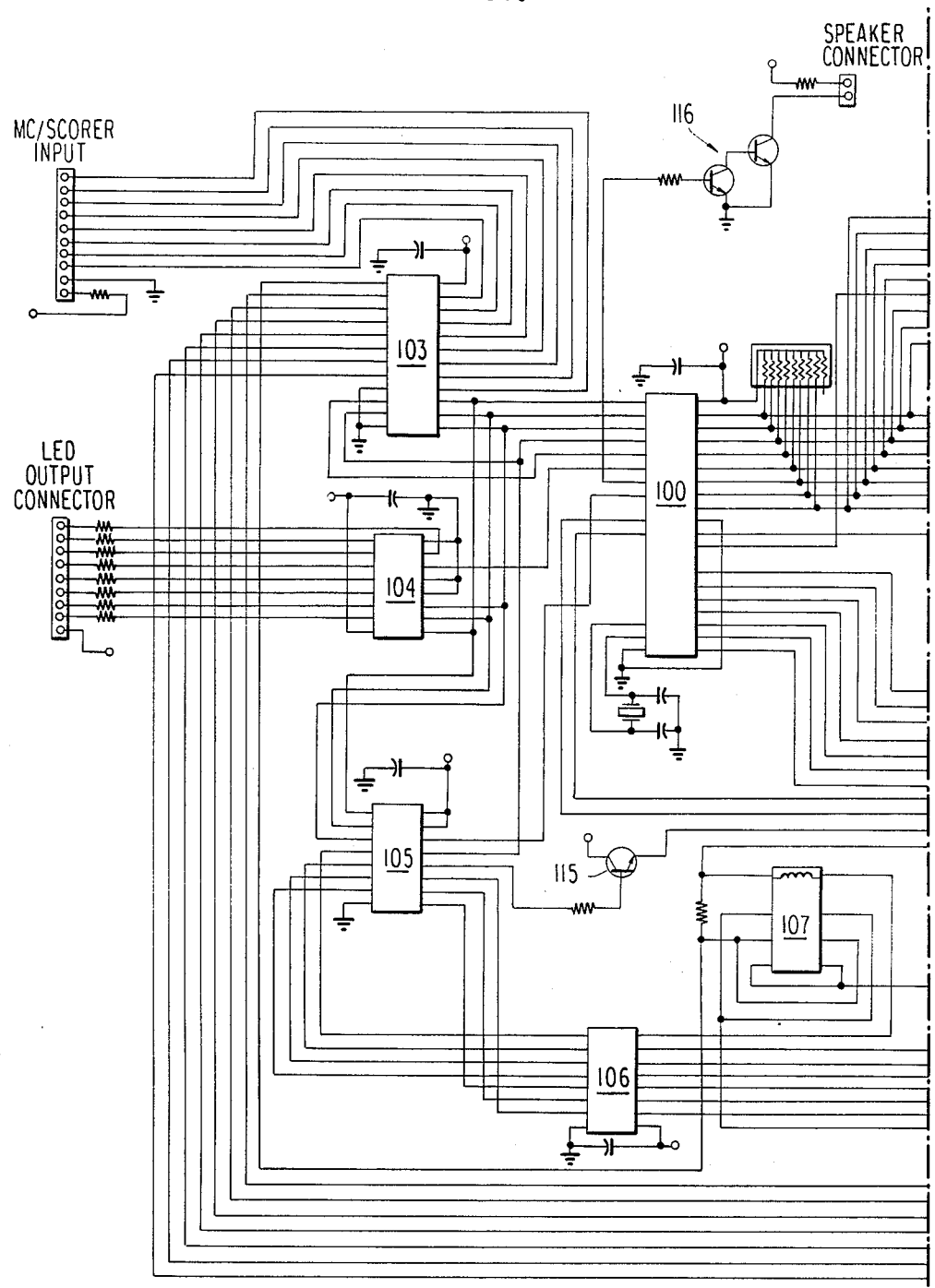
FIG. 9 illustrates the order of FIGS. 9A to 9C which taken together, are a block and schematic diagram of the circuitry of the master console.
Figure 9B:
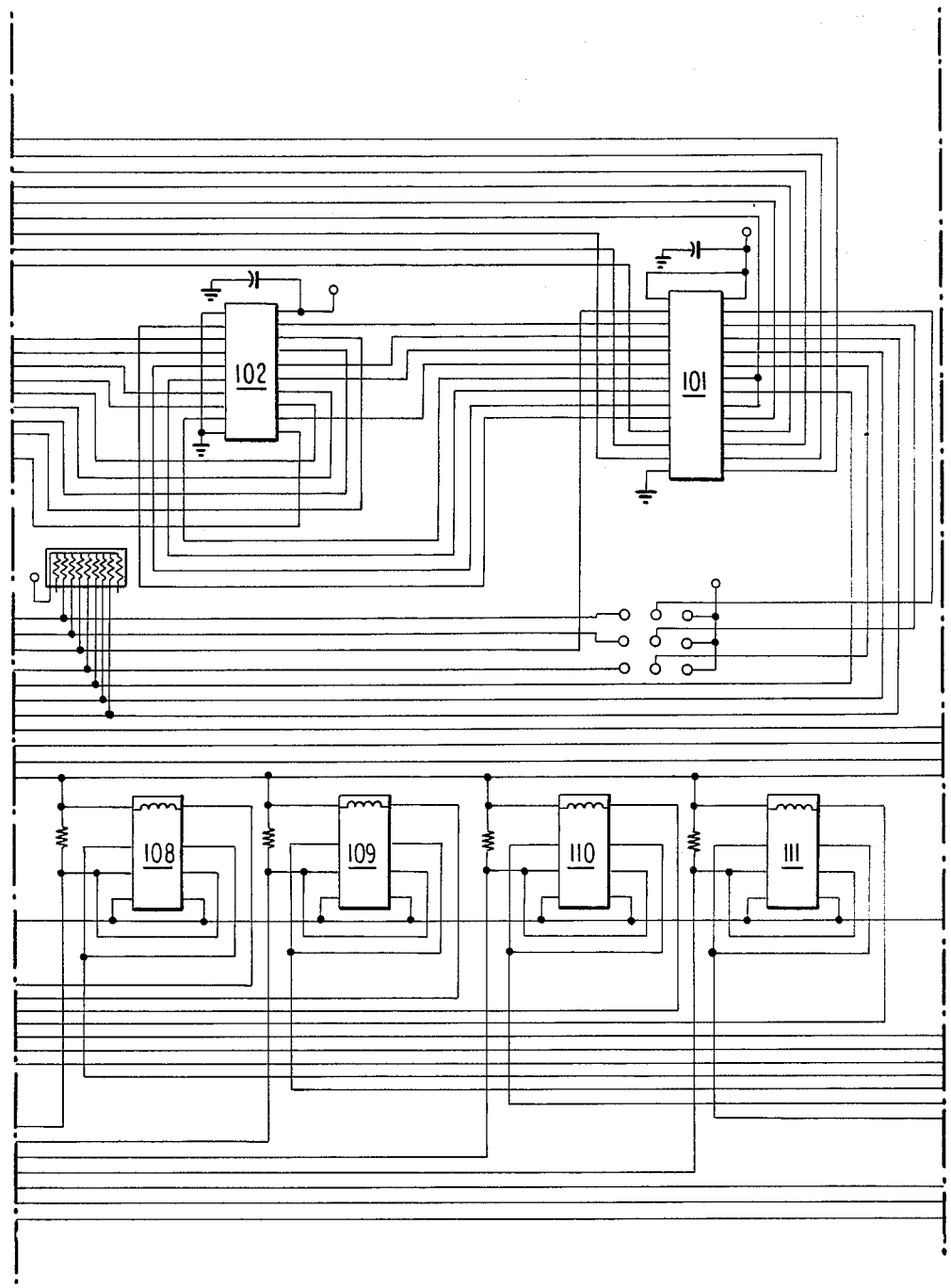

FIGS. 9A and to 9C, taken together, are a block and schematic diagram showing the circuitry of the control console. The microprocessor 100 in this specific embodiment is an Intel 8031 microprocessor which includes a limited amount of internal memory. In addition, read only memory (ROM) 101, for example a 27256 integrated circuit (IC), is provided to store the program microcode. The ROM 101 interfaces directly to pin numbers 32 to 40 of the 8031 microprocessor and through a low order address latch 102, for example a 74373 IC, to the same pins of the microprocessor. The low order address latch 102 allows the microprocessor 100 to both read or write data from the same pins.

The microprocessor 100 communicates with the outside world through a 16-bit input port 103, for example a 75150 IC, by repetitively scanning the inputs to the port. This port receives eight contestant inputs, one from each of the response stations, and can additionally receive another eight inputs from the console switches, start and mode switches, and the judge's switch pad. Thus, as few as five of the remaining eight inputs may be used for the two switches on each of the control console and the judge's switch pad, but more may be used. For example, reset inputs can be provided on one or both of the control console and the judge's switch pad bringing the total to seven.

The LEDs on the control console are selectively energized from an LED driver 104, for example a 74L5138 IC. This driver receives a 3-bit binary input from the microprocessor 100 and energizes one of eight output lines to the LEDs indicating which contestant responded first. The same 3-bit binary output is supplied to a decoder 105 which, in cooperation with a relay driver 106, energizes one of eight relays 107 to 114. The decoder may be, for example, a 74L5259 IC and the relay driver may be, for example, an XR-2203 IC. Since the latter only has seven outputs, it is necessary to separately energize relay 114 from the decoder 105 via an NPN transistor 115. The relays provide outputs to their respective contestant response units to supply −12 volts for energizing the light 16 of the response unit for the contestant who presses their switch first.

Pin number 7 of the 8031 microprocessor 100 is connected to a pair of NPN transistors 116 connected as a Darlington pair to drive a speaker output. The microprocessor may be programmed to provide two kinds of audible outputs. First, a ticking sound initiated by the moderator pressing the start switch 36. This ticking sound would continue until the time period for the selected play, i.e., fifteen seconds for fast play or five seconds for slow play, expires or until an input is received from one of the contestant response stations or a reset is actuated by either the moderator or the judge. The second audible sound is the low tone buzz which is initiated by either a time out of the response period or an input from the judge's switch pad indicating a wrong answer.

In addition, the master console includes an RS-232 serial interface 117 which allows connection of the control console to a personal computer or other output device. The personal computer or other output device may be used to keep score and provide a suitable display for the system. The serial interface may be implemented with, for example, a MAX232 IC which is connected directly to output pin numbers 10 and 11 of the 8031 microprocessor 100.

Figure 10:
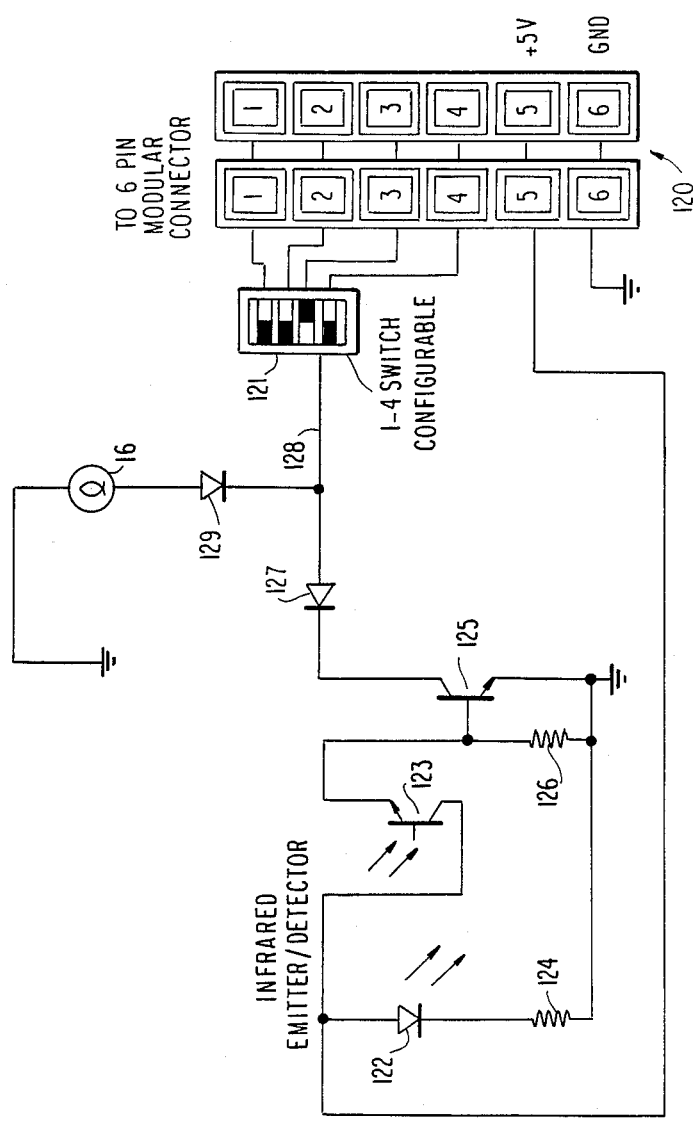
FIG. 10 is a schematic diagram of a response station.

Turning now to FIG. 10, there is shown the schematic of one response station. The three pair modular telephone jack 120 supplies +5 volt power on pin number 5 and circuit ground on pin number 6. The remaining pins numbers 1 to 4 are connected to a DIP (dual in-line package) switch 121 having four switches. As shown in the drawing, only one of these switches is closed or switched to the on position. It will be understood that the DIP switch 121 is set differently for each response station in the set of four response stations for one team. The setting in made at the factory but may be changed by the user if, for example, a replacement response station is being added to the system for another response station which has been broken or become inoperative. The DIP switch 121 is accessable through hole in the bottom of the response station bracket 84. The four lines connected to the pin numbers 1 to 4 of the modular telephone jack 120 are serially connected in a string from station to station to the corresponding relays 107 to 110 or 111 to 114 and also to the corresponding input pins of input port 104.

The switch circuitry comprises an infrared (IR) emitter/detector pair comprising and IR LED 122 and a photodetector transistor 123. The +5 volt power is connected to the cathode of LED 122, the anode of which is connected to a resistor 124 and then to ground. The +5 volt power is also supplied to the collector of transistor 123, the emitter of which is connected to the base of an NPN transistor 125 connected as a common emitter with a base bias resistor 126. The emitter of transistor 125 is connected via blocking diode 127 to DIP switch 121.

In normal operation when the switch is not depressed, the IR radiation from diode 122 impinges on the base of transistor 123 causing it to conduct. The current flow through transistor 123 and resulting voltage drop across resistor 126 causes transistor 125 to be biased into conduction thereby providing a signal ground on line 128 to the DIP switch 121 and thence to the corresponding pin of input port 104. However, upon depression of the switch, the IR radiation is blocked by the tab 17a causing transistor 125 to cease conduction thereby raising the signal voltage on the line to the DIP switch 121 and the input port 104. Assuming that the switch of this response unit is the first actuated, the microprocessor 100 provides an output which actuates the corresponding relay 107 to 114. That relay provides a −12 volt level on the same line 128 which is blocked by diode 127. However, diode 129 is poled to allow current flow through the filament lamp 16 when −12 volts is present on the line. Thus, the same line is used for two way communication. First, a +5 volt or 0 volt signal level is transmitted to the control console to report the status of the switch, and then a −12 volt lamp signal is provided by the control console to energize the lamp 16.

Figure 11:
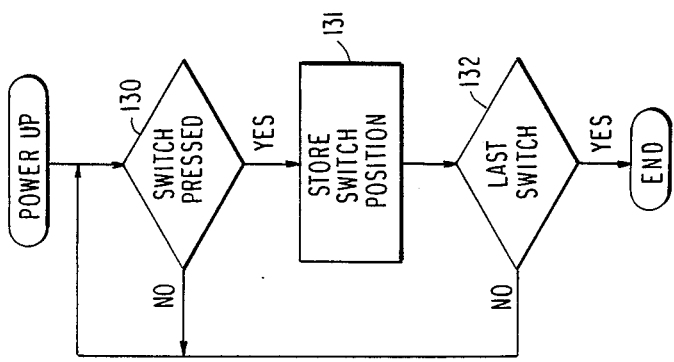
FIG. 11 is a flow chart of the learning mode process.

FIG. 11 shows in flow chart form the process in the learning mode. This mode is automatically entered by the the microprocessor 100 on power up and is necessary in order for the control console to "learn" the configuration of the system as assembled. After power up, the switches of each team are depressed in sequence to provide an output to the microprocessor 100 via input port 103. As a switch is pressed, it is detected in decision block 130 and its position is stored in the internal memory of the microprocessor as indicated by function block 131. After each switch position is stored, a test is made to determine if the last switch has been pressed in decision block 132. This is done by simply counting the number of switch positions which have been stored and, in the illustrative embodiment, when eight switches have been pressed and their positions stored, the process ends; otherwise, the process loops back to detect the next switch actuation. Upon the end of the learn mode, the microprocessor enters whatever mode is set by the switches on the control console.

While the invention has been described in terms of a single preferred embodiment, those skilled in the art will appreciate that the invention may be practiced with modification and variation within the spirit and scope of the appended claims. For example, it is possible to connect one or more control units together with one of the control units being the master control unit and the others being slave control units. This allows more than two teams to play and also allows remote locations of some teams with communication between the control units being by telephone line or other suitable communications media.

Having thus described my invention, what I claim as novel and desire to secure by Letters Patent is as follows:

1. An academic quizzer system comprising:
 a first plurality of response stations and a second plurality of response stations, each of said response stations being identical and interchangeable and including a switch and an indicator light activated by pressing said switch, and first and second female portions of modular jacks for connecting to telephone wire, said first plurality of response stations being connectable by means of telephone wire and said modular jacks into a first series string of response stations and said second plurality of response stations being connectable by means of telephone wire and said modular jacks into a second series string of response stations;
 a control console including a microprocessor, a timer, a plurality of indicators, one for each of said response stations, a start switch and a mode switch, said master console including a first and second female portions of modular jacks for connecting to telephone wire, said first and second strings of response stations being connectable respectively to said first and second female portions of said modular jacks of said master console by means of telephone wire, said microprocessor being responsive to the switches of said first and second pluralities of response stations and to said start switch and said mode switch of said control console and being operative to control said system in a plurality of modes of operation including a learn mode which, upon power up, recognizes the configuration of the system including the locations of each of the individual response stations, a directed question mode in which contestants from one or the other of two teams are asked a question, the start switch of said master console is pressed and a first predetermined period of time is counted, and a toss-up question mode in which any constestant from either team may press their switch in their response station and a second predetermined period of time less than said first predetermined period of time is counted, said microprocessor further being operative to lockout all other contestants but the first to press their switch or to lockout all contestants of one team when a question is answered incorrectly by a contestant of that team.

2. An academic quizzer system as recited in claim 1 further comprising a judge's switch pad having first and second switches for indicating, respectively, a right or a wrong answer, and a female portion of a modular jack for connecting to telephone wire, said control console further comprising a third female portion of a modular jack for connecting to telephone wire and said judge's switch pad being connectable to said third female portion of said modular jack by means of telephone wire, said microprocessor being responsive to the first and second switches on said judge's switch pad and being operative to reset or restart said time periods depending on whether a right or wrong answer is indicated.

3. An academic quizzer system as recited in claim 1 wherein each of said plurality of response stations comprise four response stations and said telephone wire comprises three pair wire connected to individual ones of said response stations in a series string and supplying power to all response stations in a series string in common.

4. An academic quizzer system as recited in claim 1 wherein each of said response stations comprises:
a switch actuated by a contestant;
a lamp for indicating actuation of said switch by a contestant;
a single, bi-directional communication line connecting said switch to said microprocessor via said telephone wire and connecting said microprocessor to said lamp via said telephone wire, said microprocessor being operative to energize said lamp over said communication line if said switch is actuated before any other switch of any other response station is actuated.

5. An academic quizzer system as recited in claim 4 wherein said response station switch is a photoelectric switch.

6. An academic quizzer system as recited in claim 5 wherein each of said response station comprises a generally L-shaped bracket having a vertical portion on which said indicator light is mounted and a horizontal portion folded back on itself to form a resiliently movable member which may be depressed by a contestant's fingers, said movable member including a tab for altering the light to said photoelectric switch and thereby altering the conductivity of said photoelectric switch.

7. An academic quizzer system as recited in claim 1 wherein said microprocessor is further operative in response to said mode switch to control said system in a practice mode of operation wherein the lockout of contestants or teams is inhibited.

8. An academic quizzer system as recited in claim 1 wherein said control console further includes a speaker connected to said microprocessor, said microprocessor being responsive to said start switch for producing an audible tone from said speaker upon the expiration of said first or second predetermined period of time 9. An academic quizzer system as recited in claim 1 wherein said control console further includes an interface for connecting to a computer.

* * * * *